United States Patent [19]

Jalbert et al.

[11] Patent Number: 5,026,777
[45] Date of Patent: Jun. 25, 1991

[54] LOW GLOSS THERMOPLASTIC MOLDING COMPOSITIONS

[75] Inventors: Ronald L. Jalbert; David O. Phillips, both of Parkersburg, W. Va.

[73] Assignee: General Electric Company, Parkersburg, W. Va.

[21] Appl. No.: 437,795

[22] Filed: Nov. 17, 1989

[51] Int. Cl.$^5$ .............................................. C08L 51/04
[52] U.S. Cl. .......................................... 525/65; 525/67; 525/71; 525/95; 525/146; 525/147; 525/316
[58] Field of Search ....................... 525/65, 67, 71, 95, 525/146, 147, 316

[56] References Cited

U.S. PATENT DOCUMENTS

| | | | |
|---|---|---|---|
| 2,890,209 | 5/1956 | Phillips et al. | 528/361 |
| 4,526,926 | 4/1983 | Weber et al. | 525/67 |
| 4,554,316 | 11/1983 | Sakano et al. | 525/71 |
| 4,612,347 | 2/1985 | Eichenauer et al. | 525/73 |
| 4,624,986 | 8/1984 | Weber et al. | 525/67 |
| 4,677,162 | 5/1986 | Grito et al. | 525/67 |
| 4,710,534 | 12/1985 | Liu | 524/411 |
| 4,761,463 | 3/1986 | Matsumoto et al. | 525/74 |

FOREIGN PATENT DOCUMENTS 63-156847  6/1988  Japan .

*Primary Examiner*—John Kight, III
*Assistant Examiner*—Sam A. Acquah
*Attorney, Agent, or Firm*—Lowe, Price, LeBlanc & Becker

[57] ABSTRACT

Thermoplastic molding compositions having an inherent matte or low gloss surface finish comprise a polymer blend of a polycarbonate and an emulsion grafted ABS polymer, and a low gloss enhancing amount of a poly(epoxide).

20 Claims, No Drawings

LOW GLOSS THERMOPLASTIC MOLDING COMPOSITIONS

FIELD OF THE INVENTION

The present invention relates to thermoplastic molding compositions having an inherent matte or low gloss surface finish. The compositions are impact resistant alloys of polycarbonate and acrylonitrile-butadiene-styrene graft (ABS) polymers.

BACKGROUND OF THE INVENTION

Many thermoplastics have a natural, high gloss finish when injection molded, particularly compositions containing styrenic polymers such as emulsion ABS polymers. For many applications, high gloss is a very desirable characteristic and it may be one of the most important factors in the selection of the material. On the other hand, for many other products, such as automotive and business equipment, for example computer and other electronic equipment, there is a trend toward matte or low gloss finishes, principally for aesthetic reasons.

One technique for obtaining low gloss is to use a textured mold surface. Textured molds are even used to mold low gloss materials in order to further accentuate the dull finish. Using a high gloss product in a textured mold does not provide optimum results because the parts are not uniform over a long run. The mold surface tends to pick up material in different areas resulting in varying degrees of gloss over the surface of the parts.

Some polymers, like polypropylene, naturally exhibit less gloss than other thermoplastic polymers. Other polymers can easily be made to exhibit low gloss by the introduction of one or more additional constituents. An example of such a polymer is high impact polystyrene which is made by mixing polybutadiene with polystyrene. The large domains of rubber within the polystyrene phase result in a low gloss material. Still another inherently low gloss thermoplastic is ABS graft polymer made by the bulk polymerization process. The latter process involves the dissolving of polybutadiene in styrene monomer and the subsequent graft reaction between the styrene and the polybutadiene together with acrylonitrile monomer. At the end of the reaction, relatively large particles of rubber are created which may contain some occluded styrene-acrylonitrile copolymer. The large particle size of these rubbery domains are believed to be responsible for the low gloss surface finish of such products.

Approaches to obtaining low gloss for materials which naturally exhibit high gloss include functionalizing the butadiene or butadiene/styrene backbone or substrate onto which the other monomers are grafted. U.S. Pat. No. 4,612,347, for example, describes an acid functionalized graft copolymer. Other methods copolymerize a glycidyl ester with acrylonitrile, a vinyl and a rubbery copolymer as described in Japanese Kokai No. 63-156847. U.S. Pat. No. 4,710,534 suggests the use of an olefin rubber in combination with ABS in a polycarbonate or polycarbonate/polybutylene terephalate blend. U.S. Pat. Nos. 4,677,162, 4,624,986 and 4,526,926 all achieve low gloss by using mass or bulk polymerized ABS. U.S. Pat. No. 4,761,463 describes the use of vinyl compounds containing glycidyl esters of unsaturated acids for low gloss surfaces and U.S. Pat. No. 4,554,316 uses epoxy and acid (anhydride) functional olefins for the same purpose.

The use of diepoxides to stabilize ABS/PBT blends is the subject of copending U.S. Pat. application Ser. No. 07/318,888 filed Mar. 6, 1989, by Jalbert and Cox and assigned to the same assignee as this application. The diepoxides are used for a different purpose in a different polymer alloy and there is nothing to suggest their use as additives to achieve low gloss in ABS/polycarbonate blends.

SUMMARY OF THE INVENTION

The present invention is directed to a low gloss resin composition in which the matte finish is achieved by the incorporation of poly(epoxide) into the formulation of an alloy of ABS and polycarbonate. While the mechanism is not entirely understood, it is believed that a reaction takes place between the epoxide and the substrate and/or the grafting monomers of the ABS such that large rubbery domains are created in the final product. When molded, the parts exhibit a uniform low gloss surface.

DETAILED DESCRIPTION OF THE INVENTION

The thermoplastic molding compositions of the invention comprise a polymer blend of a polycarbonate, an emulsion grafted ABS polymer and a low gloss enhancing amount of a poly(epoxide).

The ABS component which is included in the present compositions comprises ABS type polymers, the molecules of which contain two or more polymeric parts of different composition, namely a backbone part and a graft part, that are bonded chemically. The ABS polymer is preferably prepared by polymerizing a conjugated diene, such as butadiene, or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. The ABS resins are preferably prepared by emulsion grafting methods well known in the art.

The specific conjugated diene monomers normally utilized in preparing the backbone of the graft polymer are generically described by the following formula:

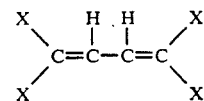

wherein X is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethylbutadiene, 2-ethyl-1,3-pentadiene 1,3- and 2,4-hexadienes, chloro and bromo substituted butadienes such as dichlorobutadiene, bromobutadiene, dibromobutadiene, mixtures thereof, and the like. A preferred conjugated diene is butadiene.

Optionally, the elastomeric backbone may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer. These resins are well known in the art and many are commercially available.

The backbone polymer, as mentioned, is preferably a conjugated diene polymer such as polybutadiene, polyisoprene, or a copolymer, such as butadiene-styrene, butadiene-acrylonitrile, or the like.

One monomer or group of monomers that may be polymerized in the presence of the prepolymerized backbone to form the graft portion of the ABS resin include monovinylaromatic compounds. The monovinylaromatic monomers utilized are generically described by the following formula:

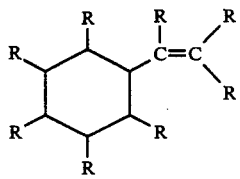

wherein R is selected from the group consisting of hydrogen, alkyl groups of 1 to 5 carbon atoms, cycloalkyl, aryl, alkaryl, aralkyl, alkoxy, aryloxy, and halogens. Examples of substituted vinylaromatic compounds include styrene, 4-methylstyrene, 3,5-diethylstyrene, 4-n-propylstyrene, α-methylstyrene, α-methyl vinyltoluene, α-chlorostyrene, α-bromostyrene, dichlorostyrene, dibromostyrene, tetra-chlorostyrene, mixtures thereof and the like. The preferred monovinylaromatic monomers used are styrene and/or α-methylstyrene.

A second group of monomers that may be polymerized in the presence of the prepolymerized backbone to form the graft portion of the ABS resin include acrylic monomers such as acrylonitrile, substituted acrylonitrile, and/or acrylic acid esters, for example alkyl acrylates such as methyl methacrylate.

The acrylonitrile, substituted acrylonitrile, or acrylic acid esters are described generically by the following formula:

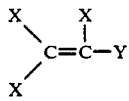

wherein X is as previously defined and Y is selected from the group consisting of cyano and carbalkoxy groups wherein the alkoxy group of the carbalkoxy contains from one to about twelve carbon atoms. Examples of such monomers include acrylonitrile, ethacrylonitrile, methacrylonitrile, α-chloroacrylonitrile, β-chloroacrylonitrile, α-bromoacrylonitrile, β-bromoacrylonitrile, methyl acrylate, methyl methacrylate, ethyl acrylate, butyl acrylate, propylacrylate, isopropyl acrylate and mixtures thereof. The preferred acrylic monomer is acrylonitrile and the preferred acrylic acid esters are ethyl acrylate and methyl methacrylate. It is also preferred that the acrylic acid esters, when included, are employed in combination with acrylonitrile.

In the preparation of the graft copolymer, the conjugated diolefin polymer or copolymer exemplified by a 1,3-butadiene polymer or copolymer preferably comprises at least about 50% by weight, and more preferably at least about 70% by weight, and up to about 80% by weight, of the total ABS graft polymer. The monomers polymerized in the presence of the backbone, exemplified by styrene and acrylonitrile, preferably comprise from about 20 to about 50% by weight of the total ABS graft polymer. It is additionally preferred that the second group of grafting monomers, exemplified by acrylonitrile, ethyl acrylate and methyl methacrylate, comprise from about 10% to about 40% by weight of the grafted portion of the ABS resin while the monovinylaromatic hydrocarbon monomers, exemplified by styrene, comprise from about 60 to about 90% by weight of the grafted portion of the ABS resin.

In preparing the polymer, it is normal to have a certain percentage of the polymerizing monomers that are grafted on the backbone combine with each other and occur as non-grafted rigid copolymer. If styrene is utilized as one grafting monomer and acrylonitrile is the second grafting monomer, a certain portion of the composition will copolymerize as free styrene-acrylonitrile copolymer. Similarly, in the case where α-methylstyrene (or another monomer) is substituted for the styrene in the composition used in preparing the graft polymer, a certain percentage of the composition may be an α-methylstyrene-acrylonitrile copolymer.

Also, there are occasions where a rigid polymer or copolymer, such as α-methylstyrene-acrylonitrile copolymer may be added to the graft ABS polymer by mechanical blending. The rigid polymers and copolymers which may be so added may be based on one or more of the following: monovinylaromatic compounds, methacrylic acid esters of $C_1$–$C_4$ aliphatic alcohols, acrylonitrile, substituted acrylonitrile and imidized maleic anhydride derivatives which are unsubstituted or substituted with an alkyl or aryl group. Examples of these rigid copolymers which may be added to the ABS graft polymer include polymethylmethacrylate (PMMA), copolymers of methyl methacrylate with one or more of the $C_1$–$C_4$ acrylates, styrene, α-methylstyrene and/or acrylonitrile, and the like. Such rigid copolymers may be prepared by emulsion, bulk, suspension, bulk-suspension or solution polymerization methods which are well known in the art.

In a preferred embodiment of the invention, the ABS resin contains at least 70 wt % of the diene rubber backbone and little or no free rigid polymers or copolymers are included in the molding composition. In an alternative preferred embodiment, the ABS resin contains at least 50 wt % of the diene rubber backbone and at least a small amount of rigid polymers or copolymers are included in the molding composition.

The present compositions also contain a polycarbonate component. Polycarbonates are a special class of polyesters derived from the reaction of carbonic acid derivatives with aromatic, aliphatic, or mixed diols. They may be produced by the reaction of phosgene with a diol in the presence of an appropriate hydrogen chloride receptor or by a melt transesterification reaction between the diol and a carbonate ester. Polycarbonate can be made from a wide variety of starting materials, however, the principal polycarbonate produced commercially and preferred herein is bisphenol A polycarbonate, a polycarbonate made by reacting bisphenol A with phosgene by condensation. Also preferred are blends of bisphenol A polycarbonate with homopolymers and/or copolymers of brominated bisphenol A polycarbonate.

For a more complete discussion of the chemistry of polycarbonates, one may refer to Kirk-Othmer Encyclopedia of Chemical Technology, Third Edition (1982) Vol. 18, pp. 479–494. This article, by D. W. Fox, is incorporated by reference in its entirety.

The present compositions also include a poly(epoxide) component which preferably comprises a diepoxide. Various diepoxides which are useful in the present invention are described in U.S. Pat. No. 2,890,209. The diepoxides may be prepared by the catalytic esterification of 3,4-epoxycyclo-hexylmethyl 3,4-epoxycyclohexanecarboxylates and have the general formula:

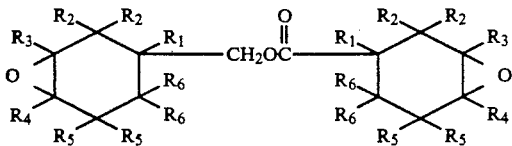

wherein $R_1$, $R_2$, $R_3$, $R_4$, $R_5$ and $R_6$ represent members selected from the group consisting of hydrogen and lower alkyl groups containing one to four carbon atoms. When any of $R_1$ through $R_6$ represent alkyl groups and particularly the lower alkyl groups, a preferred class of diepoxides are those wherein the total number of carbon atoms contained in the alkyl groups does not exceed twelve. A particularly preferred class of compounds represented by the general formula above are those wherein $R_1$ through $R_6$ represent members selected from the group consisting of hydrogen and methyl groups. Polymers and particularly the homopolymers made from diepoxide monomers and mixtures thereof having not more than three alkyl substituents per carbocyclic ring are preferred.

The diepoxides represented by the above formula can be conveniently prepared by reacting a selected 3-cyclohexenyl-methyl-3-cyclohexenecarboxylate with peracetic acid. The 3-cyclohexenyl-methyl-3-cyclohexenecarboxylates, in turn, are readily prepared by reacting a selected 3-cyclohexenecarboxy aldehyde in the presence of an aluminum alkoxide catalyst dissolved in an inert solvent, such as benzene, at a temperature in the range of 0° to 110° C.

The compositions of the invention preferably contain the poly(epoxide) constituent in an amount sufficient to enhance the matte finish of the blends. In preferred embodiments, the compositions contain from about 0.01 to about 5 weight percent of the diepoxide, and more preferably from about 0.1 to about 2 weight percent of the diepoxide, based on the weight of the ABS/Polycarbonate blend. The compositions may also include conventional additives such as antioxidants, lubricants, pigments, phosphates, halogenated fire retardant additives and the like. The blend of ABS resin and polycarbonate preferably comprises from about 5 to about 95 wt. % polycarbonate and from about 95 to about 5 wt. % ABS. More preferably, the blend comprises from about 80 to about 95 wt. % polycarbonate and about 20 to about 5 wt. % ABS. If the blend also includes a free rigid polymer or copolymer, it is preferred that the blend contains from about 10 to about 95 wt. % polycarbonate, from about 3 to about 45 wt. % ABS and up to about 55 wt. % of the free rigid polymer or copolymer.

A preferred diepoxide based resin comprises ERL 4221 supplied by Union Carbide. Other multifunctional epoxides that are expected to function in a manner similar to the preferred diepoxides include the following:

SIMPLE ALIPHATIC DIEPOXIDES butadiene dioxide;
pentadiene dioxide;
hexadiene dioxide;
dodecatriene dioxide;
dipentene dioxide;
1,2,7,8-diepoxy octane

BIS(GLYCIDYL ETHER/ESTER) EPOXIDES polycondensates of epihalohydrin and diols or diacids wherein the diol/diacid may be either aliphatic or aromatic, such as adipic acid and phthallic acid;
1,4 butanediol-diglycidyl ether;
Bis-glycidyl ether of bisphenol A

CYCLOALIPHATIC DIEPOXIDES 3,4-epoxycyclohexyl-3,4-epoxycyclohexylcarboxylate, e.g. Union Carbide's ERL 4221;
bis(c,4-epoxycyclohexylmethyl)adipate, e.g. Union Carbide's ERL 4229;
dicyclobutadiene dioxide;
dicyclopentadiene dioxide;
dicyclohexadiene dioxide;
cyclooctadiene (1,5)di-epoxide;
1,2,5,6-diepoxy cyclododecane-9;
bicycloheptadiene diepoxide

MIXED ALIPHATIC AND CYCLOALIPHATIC DIEPOXIDES vinyl cyclobutene dioxide;
vinyl cyclopentadiene dioxide;
vinyl cyclohexene dioxide, e.g. Union Carbide's ERL 4206;
butenecyclobutene dioxide;
butenecyclopentene dioxide;
butadienecyclobutadiene dioxide;
butadienecyclopentadiene dioxide;
pentadienecyclobutadiene dioxide

TRI AND POLY (DI/TRI) EPOXIES glycidyl ethers, of novalaks, e.g. Dow's D.E.R. 431 and Shell's Epon 1031;
tetraglycidyl ether of 1,1,2,2 tetrakis(4-hydroxyphenyl)ethane;
triglycidyl ether of 1,3,6-trihydroxybenzene;
triglycidyl isocyanurate (TGIC)

EPOXIDIZED DRYING AND NON-DRYING OIL ACIDS

Epoxidized tall oils, e.g. Monoplex S-73;
Epoxidized linseed oils;
Epoxidized soy bean oils, e.g. Paraplex G-62

In order to better understand the invention, the following examples are set forth.

EXAMPLES 1–8

Blends were prepared using: (1) two different bisphenol A polycarbonates (PC A and PC B) having respective values of $M_w$ of about 40,000 and 30,000; (2) a high rubber graft ABS made by emulsion polymerization and containing 50 wt % butadiene, 38 wt % styrene and 12 wt % acrylonitrile, and, optionally (3) a rigid styrene-acrylonitrile copolymer (SAN) which was bulk polymerized and had a styrene to acrylonitrile ratio of about 3:1 and an $M_w$ of about 95,000, methyl methacrylate-butadiene-styrene (MBS) supplied under the tradename Kaneka B56, or polymethylmethacrylate (PMMA) supplied by Rohm and Haas as Plexiglas V920. The polyepoxide component included in the blends comprised Union Carbide ERL 4221 Cycloaliphatic Diepoxy Resin. An antioxidant comprising Ciba Geigy's Irganox 1010 was also included in the blends. All blends were compounded on a Leistritz 34 mm twin screw extruder with a barrel temperature of 500° F. Test specimens were injection molded on a 3 oz. Van Dorn using a melt temperature of 550° F., a mold temperature of 150° F. and a fill rate of 0.8 in./sec.

Samples were tested for both impact strength and gloss, the latter using a standard Gardner gloss analyzer. The results are set forth in Table 1 below.

TABLE 1

| Examples | 1 | 2* | 3 | 4 | 5 | 6 | 7 | 8 |
|---|---|---|---|---|---|---|---|---|
| PC A | 93 | 90.2 | 64 | 64 | — | — | 65 | 65 |
| PC B | — | — | — | — | 50 | 50 | — | — |
| ABS | — | 9.8 | 16 | 16 | 15 | 15 | 15 | 14 |
| MBS | 7 | — | — | — | — | — | — | — |
| SAN | — | — | 20 | 20 | 35 | 35 | — | — |
| PMMA | — | — | — | — | — | — | 20 | 21 |
| EPOXIDE | .25 | .25 | — | .25 | — | .25 | — | .25 |
| ANTIOXIDANT | .2 | .2 | — | — | — | — | — | .2 |
| GARDNER GLOSS SMOOTH SURFACE INJECTION MOLDED 60° ANGLE | 104 | 38 | 87 | 50 | 98 | 37 | 96 | 37 |
| ⅛" NOTCHED IZOD (FT-LB/IN) AT 73° F. | 13.3 | 13.1 | 14.2 | 12.7 | 8.9 | 9.0 | 11.5 | 10.4 |

*The ABS employed in Example 2 included 70 wt % butadiene and 30 wt % of styrene and acrylonitrile in a ratio of about 3:1.

EXAMPLES 9-17

Samples were prepared using a high rubber graft ABS blended with polycarbonate and a rigid copolymer of styrene and acrylonitrile in the same manner described in connection with Examples 1-8. The effect of increasing the loading of the diepoxide was determined over a range of 0.1 to 0.5 parts by weight as well as varying the injection rate. The results are set forth in Table 2 below.

TABLE 2

| Example | 9 | 10 | 11 | 12 | 13 | 14 | 15 | 16 | 17 |
|---|---|---|---|---|---|---|---|---|---|
| PC B | 50 | 50 | 50 | 50 | 50 | 50 | 50 | 50 | 50 |
| ABS | 15 | 15 | 15 | 15 | 15 | 15 | 15 | 15 | 15 |
| SAN | 35 | 35 | 35 | 35 | 35 | 35 | 35 | 35 | 35 |
| AO[1] | .1 | .1 | .1 | .1 | .1 | .1 | .1 | .1 | .1 |
| Lube[2] | 1 | 1 | 1 | 1 | 1 | 1 | 1 | 1 | 1 |
| Epoxide A[3] | — | .1 | .2 | .25 | .3 | .5 | — | — | — |
| Epoxide B[4] | — | — | — | — | — | — | .25 | — | — |
| Epoxide C[5] | — | — | — | — | — | — | — | .25 | — |
| Epoxide D[6] | — | — | — | — | — | — | — | — | .25 |
| Izod ⅛" Impact, Room Temp. ft-lb/in. | 12.8 | 10.4 | 10.1 | 10.1 | 10.3 | 10 | 10.4 | 10.5 | 10 |
| Gardner Gloss @Injection Rate of 0.4"/sec. | | | | | | | | | |
| @60° | 92 | 87 | 37 | 26 | 18 | 8 | 62 | 69 | 53 |
| @20° | 58 | 48 | 7 | 5 | 3 | 2 | 17 | 21 | 14 |
| Gardner Gloss @Injection Rate of 2.0"/sec. | | | | | | | | | |
| @60° | 101 | 98 | 67 | 44 | 23 | 14 | 88 | 86 | 76 |
| @20° | 91 | 81 | 25 | 14 | 7 | 3 | 58 | 51 | 35 |

[1]AO is B. F. Goodrich's Goodrite 3114.
[2]Lube is a pentaerythritol tetrastearate supplied under the tradename Glycolube P.
[3]EPOXY A is ERL 4221 supplied by Union Carbide.
[4]EPOXY B is ERL 4299 supplied by Union Carbide.
[5]EPOXY C is EPON 828 supplied by Shell.
[6]EPOXY D is EPON 1031 supplied by Shell.

EXAMPLES 18-25

Additional samples were prepared in the same manner as the previous examples but varying the proportions of the high rubber ABS graft polymer, the polycarbonate and the styrene-acryonitrile copolymer and also testing the product with and without the antioxidant (Irganox 1010 and Goodrite 3114). The results are set forth in Table 3.

TABLE 3

| Example | 18 | 19 | 20 | 21 | 22 | 23 | 24 | 25 |
|---|---|---|---|---|---|---|---|---|
| PC A | 64 | 64 | 64 | 64 | — | — | — | — |
| PC B | — | — | — | — | 50 | 50 | 50 | 50 |
| ABS | 16 | 16 | 16 | 16 | 15 | 15 | 15 | 15 |
| SAN | 20 | 20 | 20 | 20 | 35 | 35 | 35 | 35 |
| DIEPOXIDE[1] | — | .25 | .25 | — | — | .25 | .25 | — |
| AO A[2] | — | .2 | — | — | — | .2 | — | — |
| AO B[3] | .1 | — | — | — | .1 | — | — | — |
| Izod Impact ft-lb/in | | | | | | | | |

TABLE 3-continued

| Example | 18 | 19 | 20 | 21 | 22 | 23 | 24 | 25 |
|---|---|---|---|---|---|---|---|---|
| RT | 14.2 | 13.6 | 12.9 | 12.7 | 8.9 | 9.4 | 8.8 | 9.0 |
| −20° F. | 9.3 | 5.4 | 8.6 | 8.8 | 2 | 2.3 | 1.9 | 1.9 |
| Gardner Gloss @0.8 in/sec. injection fill speed | | | | | | | | |
| @60 deg. | 87 | 97 | 33 | 50 | 98 | 98 | 33 | 37 |
| @20 deg. | 61 | 82 | 4 | 7 | 74 | 78 | 6 | 7 |
| Gardner Gloss @2.0 in./sec injection fill speed | | | | | | | | |
| @60 deg. | 98 | 100 | 63 | 63 | 100 | 101 | 46 | 38 |
| @20 deg. | 86 | 93 | 17 | 16 | 87 | 91 | 14 | 12 |

[1] DIEPOXIDE is Union Carbide's cycloaliphatic diepoxide ERL 4221.
[2] AO A is Ciba Geigy's hindered phenolic Irganox 1010.
[3] AO B is B. F. Goodrich's hindered phenolic Goodrite 3114.

The preceding examples are set forth to illustrate specific embodiments of the invention and are not intended to limit the scope of the compositions of the present invention. Additional embodiments and advantages within the scope of the claimed invention will be apparent to one of ordinary skill in the art.

What is claimed is:

1. A thermoplastic molding composition comprising:
   (A) a polymer blend containing about 5 to about 95 wt % of a polycarbonate and about 95 to about 5 wt % of an emulsion grafted ABS polymer; and
   (B) a low gloss enhancing amount of a poly(epoxide).

2. A thermoplastic molding composition as defined in claim 1 wherein the polymeric blend contains from about 80 to about 95 wt % of the polycarbonate and from about 20 to about 5 wt % of the emulsion grafted ABS polymer.

3. A thermoplastic molding composition as defined in claim 2 wherein the polycarbonate is selected from bisphenol A polycarbonates and blends of bisphenol A polycarbonates with a homopolymer or copolymer of brominated bisphenol A polycarbonates.

4. A thermoplastic molding composition as defined in claim 3 wherein the emulsion grafted ABS polymer comprises at least 70 wt % of the diene rubber.

5. A composition as defined in claim 1 wherein said (poly)epoxide is a diepoxide.

6. A composition as defined in claim 5 wherein said (poly)epoxide has the structural formula:

$$\text{[structural formula with two cyclohexane-like rings with R substituents, connected via } -C(H_2)-O-C(O)- \text{ linkage]}$$

wherein each R is hydrogen or a lower alkyl group containing 1 to 4 carbon atoms and may be the same or different.

7. A composition as defined in claim 1 wherein said poly(epoxide) is present in an amount of from about 0.01 to about 5 wt % based on the weight of said polymer blend.

8. A composition as defined in claim 7 wherein the poly(epoxide) is present in an amount of from about 0.1 to about 2 wt % based on the weight of the polymer blend.

9. A composition as defined in claim 1 wherein the poly(epoxide) comprises an aliphatic diepoxide.

10. A composition as defined in claim 1 wherein the poly(epoxide) comprises a mixture of aliphatic and cycloaliphatic diepoxides.

11. A composition as defined in claim 1 wherein the poly(epoxide) comprises a bis(glycidyl ether) epoxide or a bis(glycidyl ester) epoxide.

12. A thermoplastic molding composition as defined in claim 1 wherein the emulsion grafted ABS polymer contains at least 50 wt % of a diene rubber onto which is grafted a monovinyl aromatic compound and an ethylenically unsaturated nitrile compound.

13. A composition as defined in claim 12 wherein the polymer blend further contains a free rigid polymer or copolymer.

14. A composition as defined in claim 13 wherein the free rigid component is included in an amount up to about 55 wt %.

15. A composition as defined in claim 14 wherein the free rigid component is formed from one or more monomers selected from the group consisting of monovinyl aromatic compounds, methacrylic acid esters of $C_1$–$C_4$ aliphatic alcohols, acrylonitrile, substituted acrylonitrile and imidized maleic anhydride derivatives which are unsubstituted or substituted with an alkyl or aryl group.

16. A composition as defined in claim 15 wherein the free rigid component comprises a styrene-acrylonitrile copolymer.

17. A thermoplastic molding composition comprising
   (A) a polymer blend containing from about 10 to about 95 wt % polycarbonate, from about 3 to about 45 wt % of an emulsion grafted ABS polymer and up to about 55 wt % of a free rigid polymer or copolymer, and (B) a low gloss enhancing amount of a poly(epoxide).

18. A composition as defined in claim 17 wherein the polymeric blend comprises a bisphenol A polycarbonate, an emulsion grafted ABS polymer containing at least 50 wt % of a diene rubber and a styrene-acrylonitrile copolymer.

19. A composition as defined in claim 18 wherein said poly(epoxide) is present in an amount of from about 0.01 to about 5 wt % based on the weight of said polymer blend.

20. A composition as defined in claim 17 wherein the free rigid polymer or copolymer is formed from at least one monomer selected from the group consisting of monovinyl aromatic compounds, methacrylic acid esters of $C_1$–$C_4$ aliphatic alcohols, acrylonitrile, substituted acrylonitrile and imidized maleic anhydride derivatives which are unsubstituted or substituted with an alkyl or aryl group.

* * * * *